United States Patent [19]

Spurr et al.

[11] 4,140,464
[45] Feb. 20, 1979

[54] MACHINE SYSTEM FOR FORMATION OF MOLECULARLY ORIENTED PLASTIC BOTTLES

[75] Inventors: Robert Spurr, West Hartford; Robert J. Duga, Enfield, both of Conn.

[73] Assignee: Emhart Industries, Inc., Farmington, Conn.

[21] Appl. No.: 805,918

[22] Filed: Jun. 13, 1977

[51] Int. Cl.² .............................................. B29D 23/03
[52] U.S. Cl. .................................... 425/533; 425/534; 264/513; 264/537
[58] Field of Search .................... 425/534, 533; 264/97

[56] References Cited

U.S. PATENT DOCUMENTS

| | | | |
|---|---|---|---|
| 3,408,056 | 10/1968 | Dockery | 425/534 |
| 3,878,282 | 4/1975 | Bonis et al. | 425/533 X |
| 3,887,316 | 6/1975 | Hestehave | 425/534 X |
| 3,947,180 | 3/1976 | Neumaier | 425/534 X |

*Primary Examiner*—Richard B. Lazarus
*Attorney, Agent, or Firm*—A. W. Breiner

[57] ABSTRACT

Machine system for continuous formation of molecularly oriented plastic bottles by blowing a heat-conditioned parison comprising a set number (N) of parison forming stations and a set but lesser number (N/X) of blowing stations, N/X being an integral fraction of N. A storage area is constructed and arranged between the parison forming and blowing stations. In the method of operation, N number of parisons are formed simultaneously at the parison forming stations, transferred to the storage area, and N/X of the parisons are sequentially withdrawn from the storage area and blown in the set number N/X of blowing stations. The temperature in the storage area is maintained within the temperature range suitable for blowing. Effective use is made of the blowing stations without loss of thermal energy from the parison forming stations.

12 Claims, 17 Drawing Figures

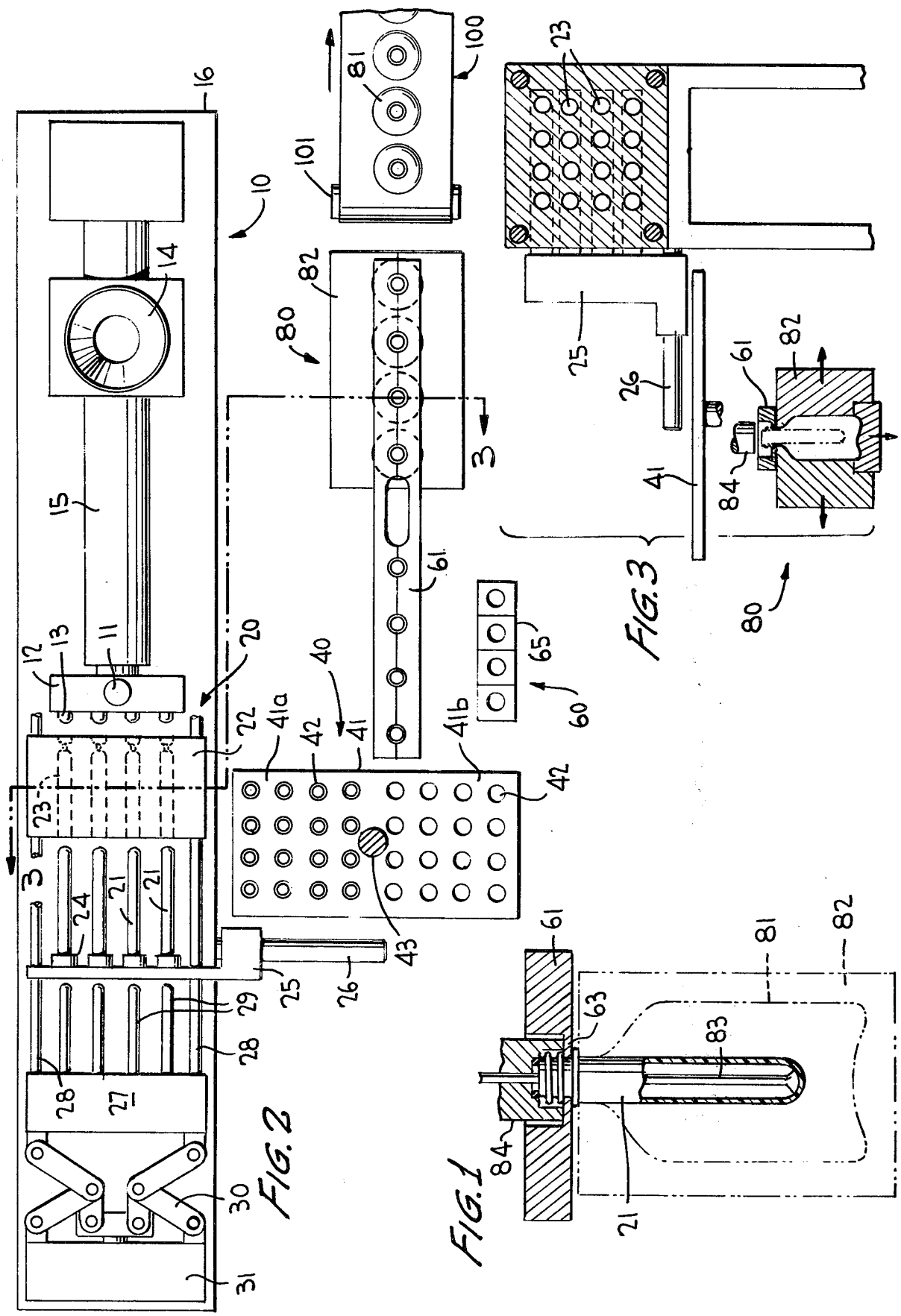

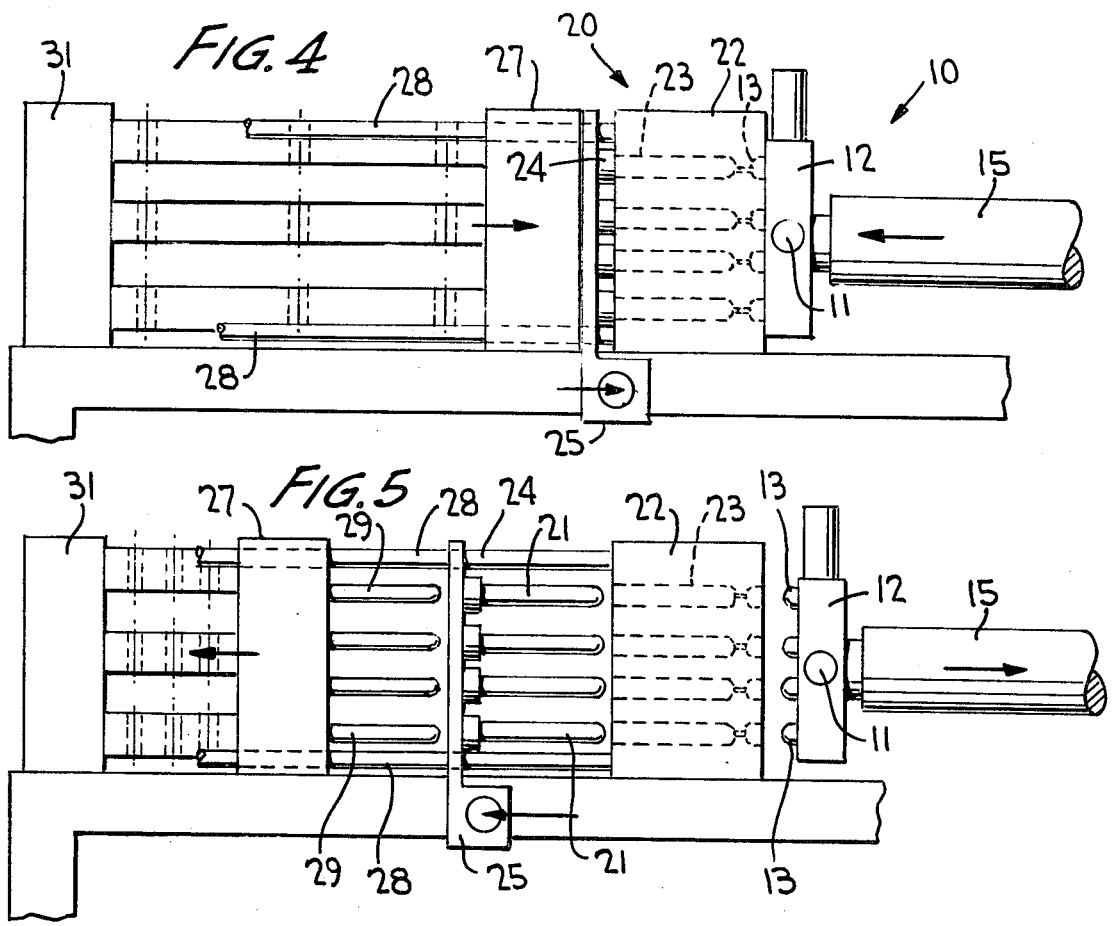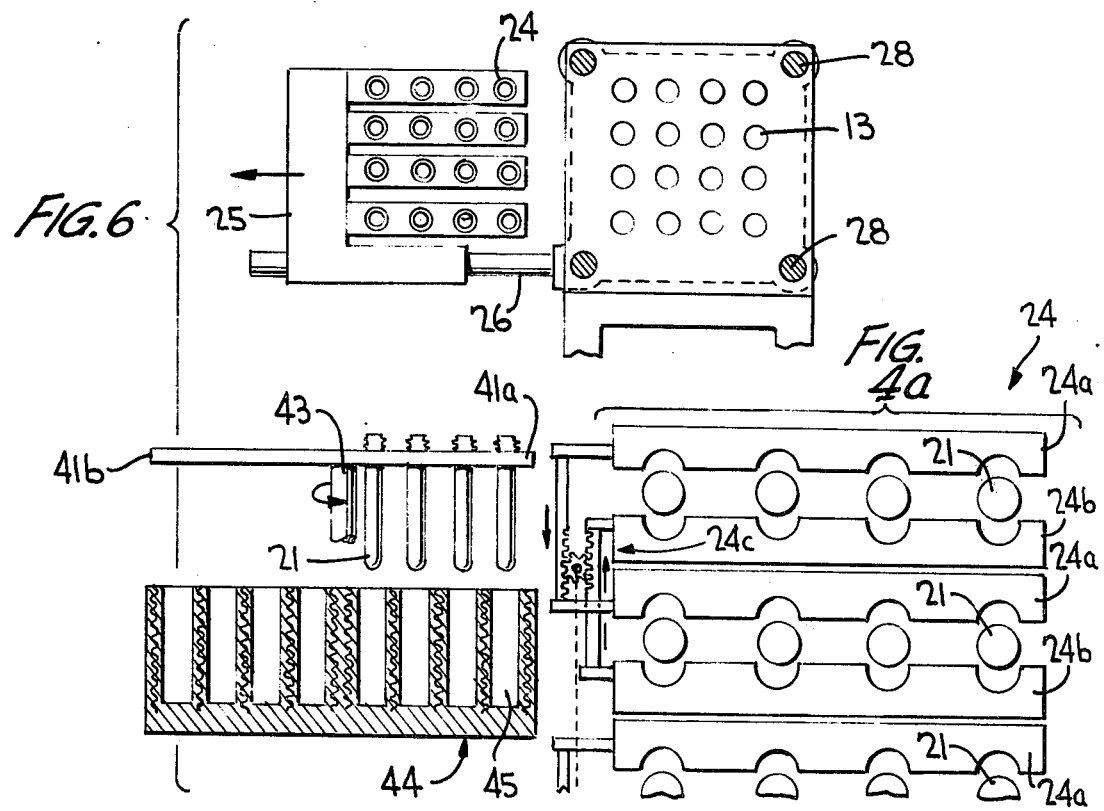

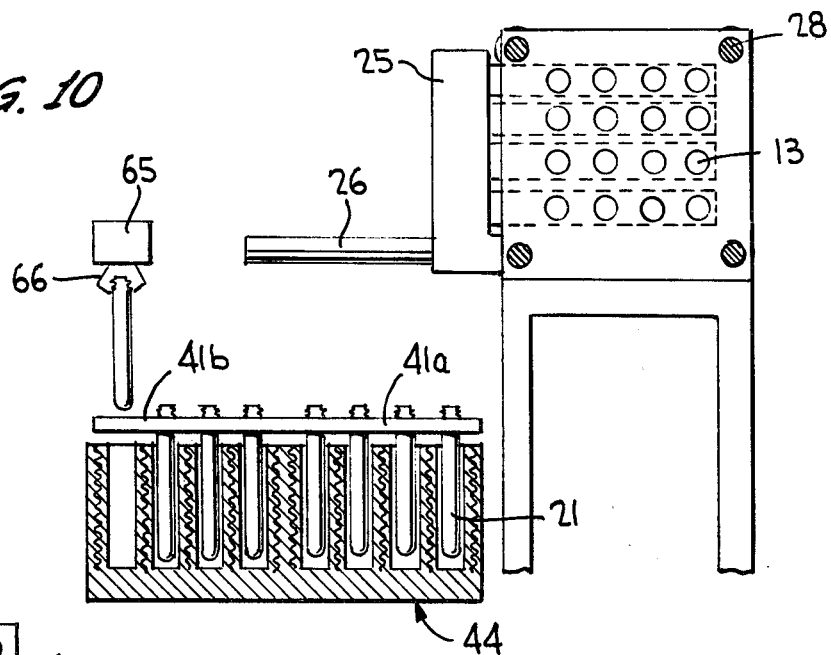
FIG. 10
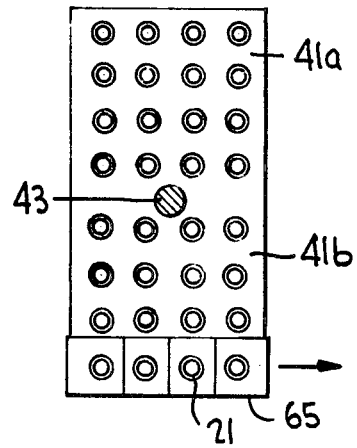
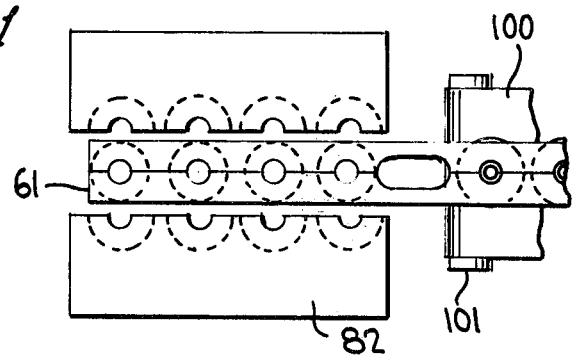
FIG. 11
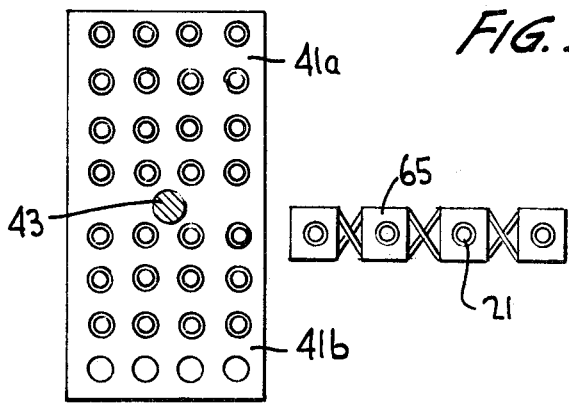
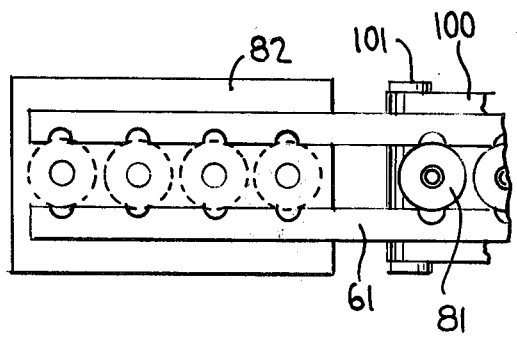
FIG. 12

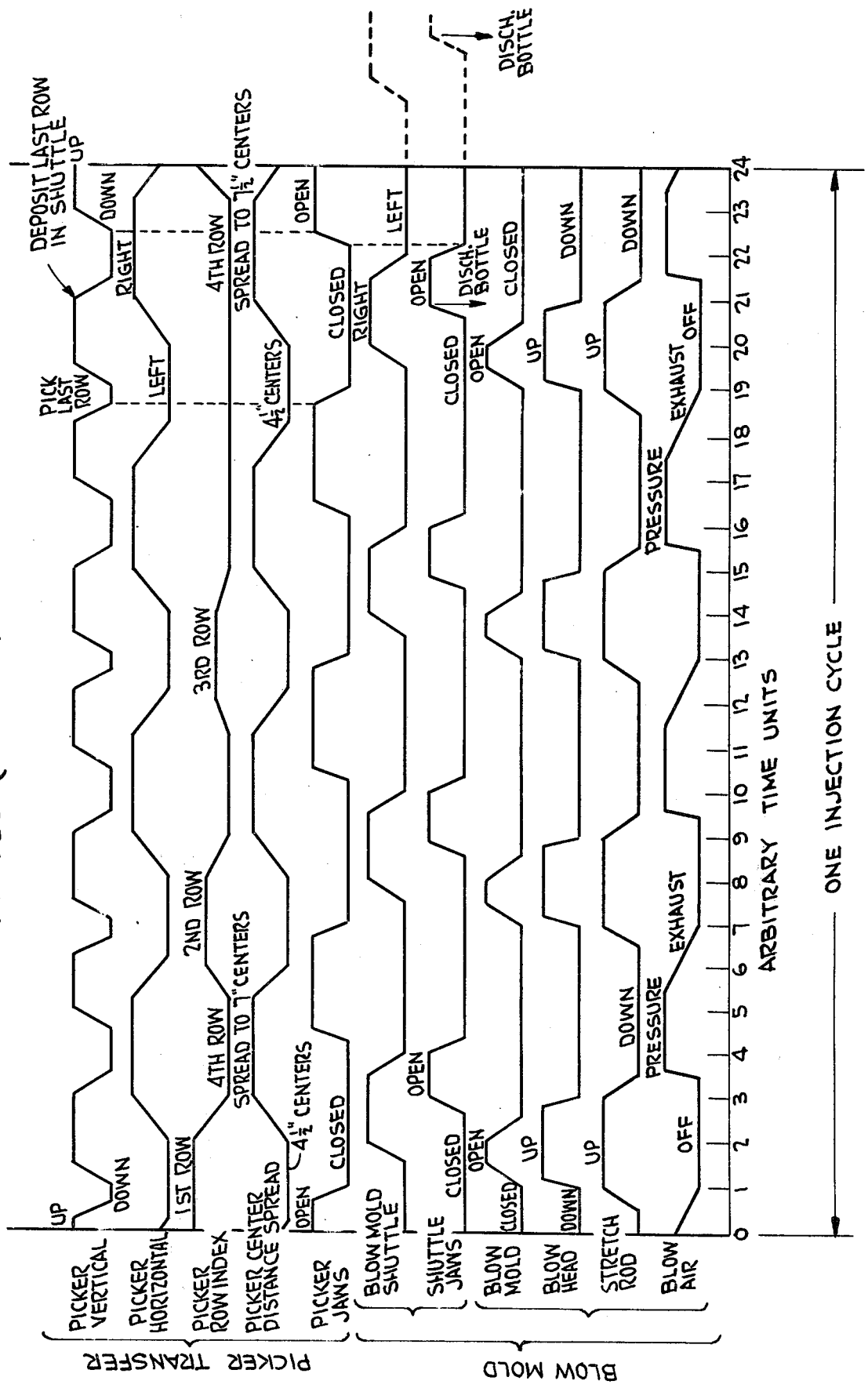

MACHINE SYSTEM FOR FORMATION OF MOLECULARLY ORIENTED PLASTIC BOTTLES

FIELD OF THE INVENTION AND BACKGROUND

This invention is directed to a method and apparatus for molding of plastic bottles. More particularly, it is directed to the hot-blow or one-step process for the manufacture of molecularly oriented plastic bottles having a high degree of blow mold utilization and overall efficiency.

In recent years substantial effort has been directed to the formation of plastic bottles as a replacement, or partial replacement of glass bottles. This effort has built on knowledge that plastic such as polyethylene terephthalate (PET) when molecularly stretched is tougher but lighter than glass and the glass art which describes both methods and apparatus for stretching and blowing glass in both the longitudinal and transverse directions.

According to the prior art, molecularly oriented containers such as plastic bottles have utilized either a reheat or two-stage process and system, or a hot-blow or one-stage process and system. In the reheat or two-stage process, parisons are first injection molded in a parison mold, cooled to room temperature, and stored for subsequent blowing into the finished bottle in a blow mold. At time of blowing, the parisons are reheated and brought to the blowing temperature of the plastic prior to blowing. In the hot-blow or one-stage process and system, the parison is injection molded in a parison mold and substantially immediately after formation is transferred at the blowing temperature to a blow mold where the parison is blown into the finished bottle.

Both of the above-noted systems have advantages and disadvantages. In the reheat process and system, efficient and effective use can be made of both the parison-forming and blowing stations which need not be integrated. However, substantial thermal energy is lost during the total operation in that the parison after formation is cooled down during storage and then reheated at time of blowing. Moreover, the parisons from storage must be fed to the blowing station, duplicating handling. The hot-blow process and system eliminates heat loss and duplicate handling. However, the advantages of the hot-blow process and system are mitigated in that conventionally, in order to have proper temperature conditioning of the parison at the blowing stage, for each parison station there is a corresponding blowing station. Since the time required for the parison forming stage, including temperature conditioning, is substantially longer than the blowing stage, i.e., approximately 20 seconds versus 5 seconds for polyethylene terephthalate (PET), inefficient use is made of the blowing stations.

OBJECTS OF THE INVENTION AND GENERAL DESCRIPTION

Accordingly, a primary object of this invention is to provide a hot-blow system for formation of molecularly oriented plastic bottles having a high degree of blow mold utilization.

It is another primary object of this invention to provide a hot-blow process for the formation of molecularly oriented plastic bottles having a high degree of blow mold utilization.

It is another object of this invention to provide an automatic process and system for the manufacture of molecularly oriented plastic bottles which permits the rapid manufacture of plastic bottles with efficient utilization of thermal energy and machine system components.

These and other objects of the present invention will be apparent from the following description, particular reference being made to the drawing.

Briefly, the aforesaid and other objects of the invention are accomplished based on the discovery that there can be a substantial delay in a hot-blow or one-step process between parison formation and the blowing of the parison without detriment to the properties of the finished bottle. Tests have established that there is no significant change in tensile yield values for delays in blowing after parison formation of up to 90 seconds and longer; and, furthermore, that temperature distribution in the walls of the parison varies only slightly over substantial periods. This discovery permits, therefore, a process and machine system wherein the number of blow molds (N/X) is an integral fraction of the number (N) of parison or injection mold cavities, with a parison storage area provided between the parison forming and blowing stations.

Although the permissible delay factor applies to all plastics capable of being molecularly blown into bottles, the length of the permissible delay varies from one plastic to another. Accordingly, for convenience in illustration, reference hereinafter will be to PET which has a tolerable delay or maximum delay of 80 to 90 seconds with the parison formation cycle time, i.e., injection molding of the parison and cooling to the orientation temperature, being 20 seconds and the stretch blow time being 5 seconds. This requires only one-fourth the number of blow molds with respect to the number of parison molds, i.e., for N parisons the process or system will require N/4 blow molds. Since N parisons are formed simultaneously and are simultaneously fed to a storage area and only N/4 parisons are removed from the storage area at one time for blowing, all N parisons will not be subjected to the same delay time before the stretch blow. The minimum time before blow is a zero to T delay where T is the injection cycle time. The upper limit will depend upon the storage space designed into the equipment, with the maximum amount of storage space being controlled by the maximum delay that can be tolerated with a given plastic, which, as above stated, for PET is 80 to 90 seconds. Thus, the storage space must be adjusted so that all N parisons formed at one time can be blown in N/X blowing stations within tolerance of the plastic used.

To maintain uniform temperature, it may be desirable during the course of the interim storage to apply supplemental heat to the storage area generally equivalent to the mean heat of the parison as delivered from the injection mold. Alternatively, it may be desirable to store the parisons in an enclosed chamber to prevent, or partially prevent, heat loss from the parison while allowing the parison wall temperature to become uniformly distributed.

The process and machine system of this invention provides for a high degree of thermal and mechanical control during the parison stage, through the storage stage and into the blow-stretch stage so that the extensive stretch and blow operation is within the thermoelastic range which produces optimum structural properties of the molecularly oriented plastic bottle.

Although various modifications can be made to the process and machine system of the present invention, it is essential that there be means for simultaneously forming a plurality of parisons, an interim storage area, and blow molds which are integral fraction of the number of parisons. In operation, it is essential that a plurality of parisons be formed simultaneously, placed in a storage area, and an integral fraction of the parisons sequentially withdrawn from the storage area and blown. For convenience, the process and machine system will be described with reference to an apparatus comprising six integrated sections, said sections being an injection assembly including injection nozzles; a parison forming section comprising 16 parison stations; an indexing storage area comprising a primary zone containing 16 individual parison storage wells and a secondary storage zone comprising 16 individual storage wells; a transfer section; a blow-stretch section comprising four blow molds, and a conveyor for carrying away formed bottles. The described system produces optimum utilization of time and equipment in both the parison cycle and the blow mold cycle, cycle, energy requirements, and eliminates external parison storage and handling problems. Improved parison temperature uniformity is also a major result.

Although the ratio of parison stations to blow stations are 16 to 4, it is to be understood that other ratios of parison molds to blow molds are readily realizable such as 8 to 2, 4 to 1, 9 to 3, 3 to 1, or the like.

DETAILED DESCRIPTION AND DRAWING

In the drawing which illustrates in detail a preferred embodiment and mode of operation, FIG. 1 is a cross-sectional view of a parison held in the jaws of a shuttle with the stretch rod inserted, the configuration of the finished bottle and blow mold being shown in broken lines;

FIG. 2 is a plan view of the machine system;

FIG. 3 is a sectional view of the machine system taken along lines 3—3 of FIG. 1;

FIGS. 4 – 15 illustrate diagrammatically the sequence of operation of the machine system of FIGS. 2 and 3 wherein FIGS. 4 and 5 are partial side views;

FIGS. 6, 7, 8, 9, and 10 are sectional views; and

FIGS. 11, 12, 13, 14, and 15 are partial plan views of various aspects of the machine system;

FIG. 4a is a plan view showing detail of the split neck ring assembly; and

Figure 16:
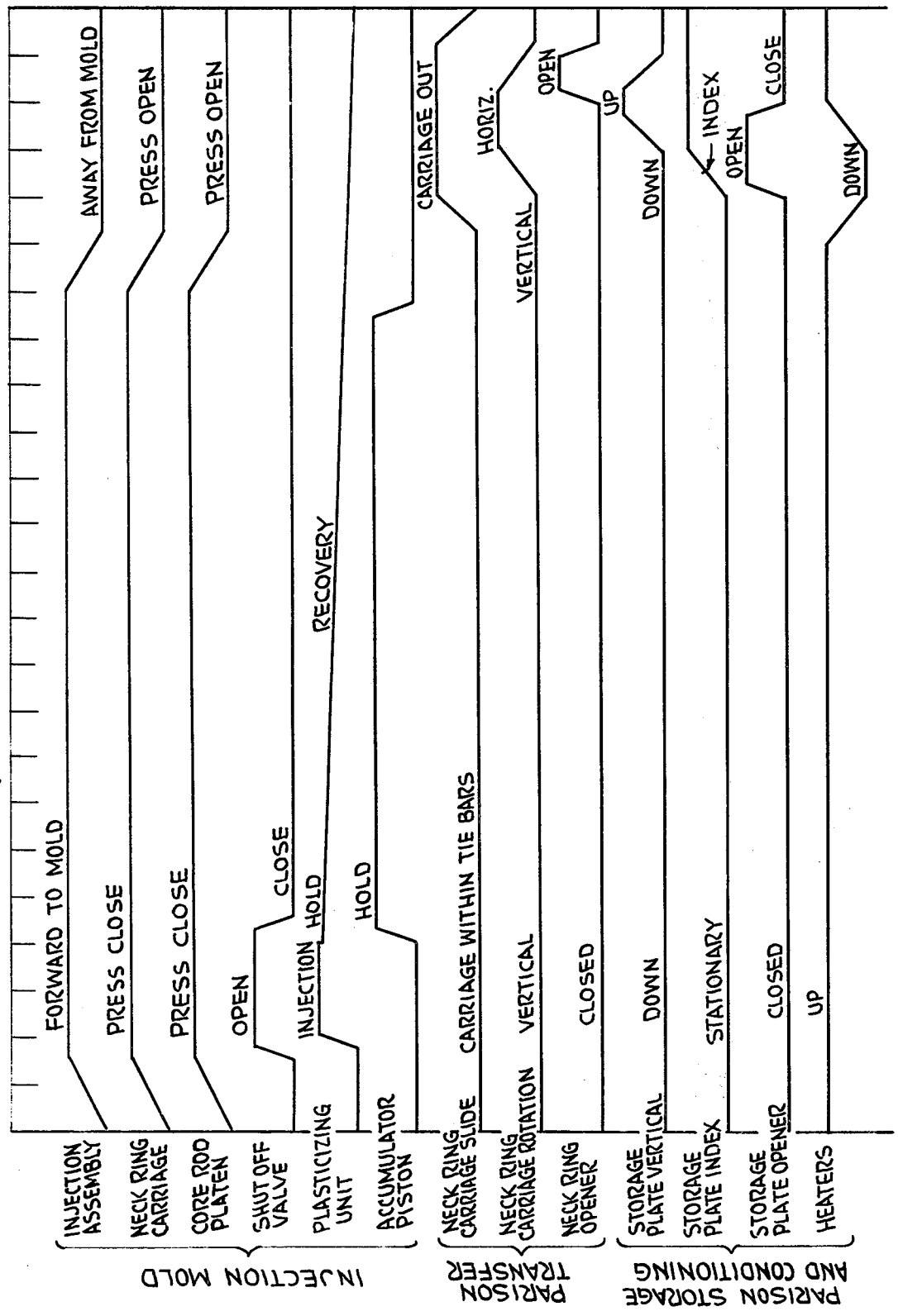

FIG. 16 is a timing diagram for the operation of the machine system.

Referring first to FIG. 1, parison 21 is held by the jaws 63 of shuttle 61 with stretch rod 83 positioned by blow head 84 within the parison prior to stretching. After the longitudinal stretching and transverse blow, the finished bottle will have the configuration of bottle 81 as shown in broken lines within blow mold 82 also shown in broken lines. As will be apparent, the ratio of the longitudinal stretch and the transverse blow can be varied depending upon the particular plastic used and the structural properties desired in the final bottle. It is to be understood that the ratio between the parison 21 and the finished bottle 81 in the drawing hereof is for diagrammatic illustration.

Referring now primarily to FIGS. 2 and 3, the machine system of the present application comprises six main sections, an injection assembly 10; a parison forming section 20; a parison storage area 40; a transfer section 60; a blowing section 80, and a conveyor for taking away finished bottles 100.

INJECTION ASSEMBLY

The injection assembly 10 is of standard configuration except at the output end of the barrel there is mounted a shut-off valve and accumulator pot 11 for packing and holding pressure, a hot runner manifold 12 for feeding a plurality of nozzles, and feeding nozzles 13. The injection assembly also includes a feed hopper 14 connected to manifold 12 through barrel and screw 15. The entire assembly is mounted on a square weldment frame 16.

PARISON FORMING SECTION

The parison forming section includes a stationary mold die plate 22 containing 16 individually insertable solid molds 23, each mold having a spiral cooling groove about its circumference of conventional design and, accordingly, not shown. As used herein, the term "solid mold" is used to distinguish from a split mold. Neck rings 24 which support parisons 21 are attached to neck ring carriage 25. These neck rings which are liquid cooled are split to allow removal of the parison. The rings preferably will open simultaneously by mechanical means; and, as shown in FIG. 4a, sections 24a move in one direction and sections 24b move in the opposite direction upon actuation of rack and pinion 24c. Neck ring carriage 25 is slidable on carriage slide bar 26 to allow the neck rings to be moved back and forth with respect to parison molds 22 and storage area 40. The core rod die plate 27 is the main movable platten of the parison forming press and applies the force to the mold components. Further, as shown most clearly in FIGS. 4 and 5, neck ring carriage 25 is slidable on core rod tie bars 28 by means of a half stroke mechanism driven by the core rod platten. The core rod die plate contains 16 core rods 29 which are individually liquid cooled and adjustable. Core rod adjustment may be axial, radial, or angular to correct core rod alignment. The press is actuated by toggle means 30 carried on base 31. However, any number of configurations can be utilized to actuate the press, including hydraulic means.

PARISON STORAGE SECTION

The storage section comprises a storage plate 41 having a plurality (32) of holes 42 for receiving parisons from neck rings 24. Plate 41 can be raised and lowered to accept the parisons from carriage 25 and can index 180° on parison storage pivot 43 to move the parisons from a primary storage area 41a which accepts the parisons from neck rings 24 on carriage 25 to a secondary storage area 41b. A 32-chamber heating assembly 44 (as shown, for example, in FIG. 6) is positioned below the storage plate, each chamber 45 being of cylindrical design to completely surround a parison 21. This heating assembly moves up and down to permit indexing of the storage plate.

TRANSFER SECTION

The transfer mechanism consisting of a parison picker 65 and shuttle 61 transfers parisons row by row, four at a time, from the secondary storage area 41b of the storage plate to the blow mold 82.

BLOW MOLD SECTION

The blow mold section comprises four liquid cooled molds 82 which split simultaneously for opening and closing of the molds to allow for insertion of the parisons and finish bottle removal. Above the molds are blow heads 84 and stretch rods 83 which enter the parison as shown in FIG. 1 and simultaneously stretch the parison in the longitudinal direction while blowing air to transversely blow the parison to the configuration of the mold, or the parison can be sequentially stretched and transversely blown. When sequentially stretching and blowing, it is desirable to blow low pressure air during stretching to prevent parison collapse on the stretch rod.

CONVEYOR SECTION

The conveyor section comprises a suitable endless belt 100 on rollers 101 constructed and arranged with the blow molds 82 to receive and convey away finish bottles 81 dropped thereon by shuttle 61.

MODE OF OPERATION OF MACHINE SYSTEM

The machine system is operated according to the timing diagram shown in FIG. 16. This timing sequence can be varied to suit processing requirements for a particular plastic material. The timing sequence of FIG. 16 is for manufacturing bottles from PET.

Referring first to FIG. 4 which is a partial side view of the machine system showing the injection assembly and parison section, the parison press is closed with the neck ring carrier 25 and core rod platten 27 in the mold position, and with injection nozzles 13 forward for injection. The injection nozzles are moved into injection position via an injector slide carriage which permits movement of barrel 15 and manifold 12 the relatively short distance necessary for positioning of nozzles 13 for injection.

The shut-off valve 11 is opened and plastic is injected into the mold cavity of mold 23 until filled after which the injection pressure is dropped to a lower holding pressure. At this point, the accumulator piston is activated and the shut-off valve is closed. Since the valve is between the plasticizing screw and the accumulator piston, the accumulator piston controls the holding pressure of the plastic in the mold and the small amount of plastic in front of the piston can be used to "make up" any volume loss due to plastic shrinkage in the molds. Since holding pressure is no longer required by the plasticizing unit which is now isolated from the molds by the valve, the plasticizing screw can immediately begin the recovery process. The accumulator piston is returned which acts as a suck back to prevent plastic dribbling out of the nozzle.

After the injection of the parison is complete and the parison temperature conditioned, the injection nozzle is pulled back, core rod platten 27 retracted, and neck ring carrier 25 retracted carrying the finished parisons 21, as shown in FIG. 5. The finished parisons are then ready to be transferred to the parison storage area.

Referring to the sectional view of FIG. 6, the neck ring carrier 25 is shown in the out position, i.e., extended on slide 26. The heating chamber 45 for the parisons is in the down position showing a set of parisons in the primary storage zone 41a of the storage plate. In a continuous operation this means that the fourth and last row of parisons from the secondary storage area has just been removed by picker 65 and the secondary area completely empty. However, the primary area is full. The storage plate is indexed 180° so that the parisons are transferred to the secondary storage area 41b as shown in FIG. 7.

Figure 7:
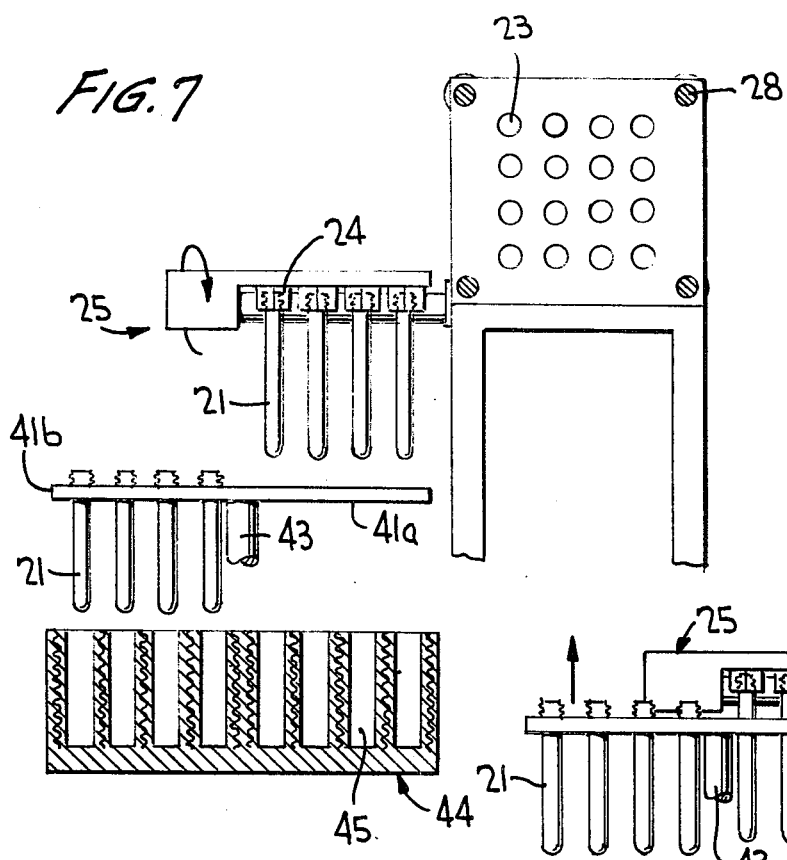

FIG. 7 further illustrates the 90° clockwise rotation of neck ring carrier 25 which preferably occurs simultaneously with the storage plate indexing, positioning the parisons to be received in the now vacant primary storage area 41a of the storage plate.

Figure 8:
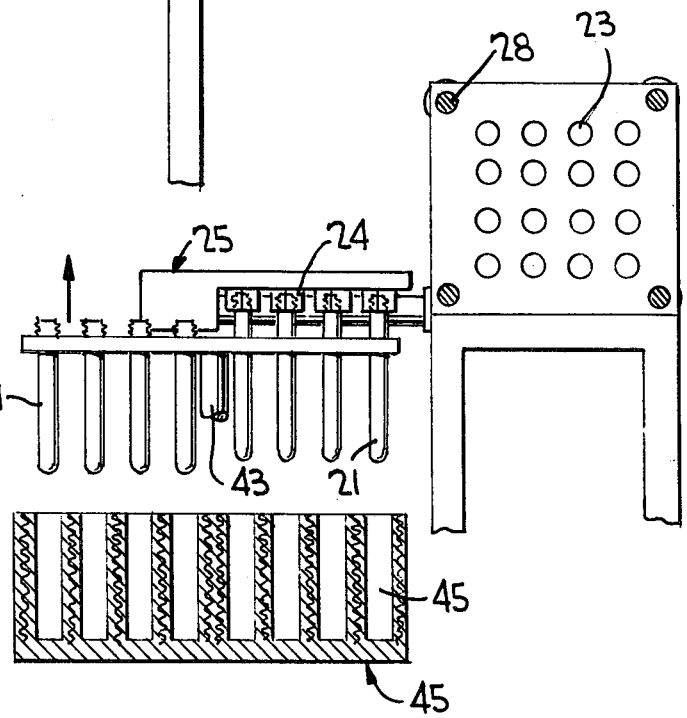
Figure 9:
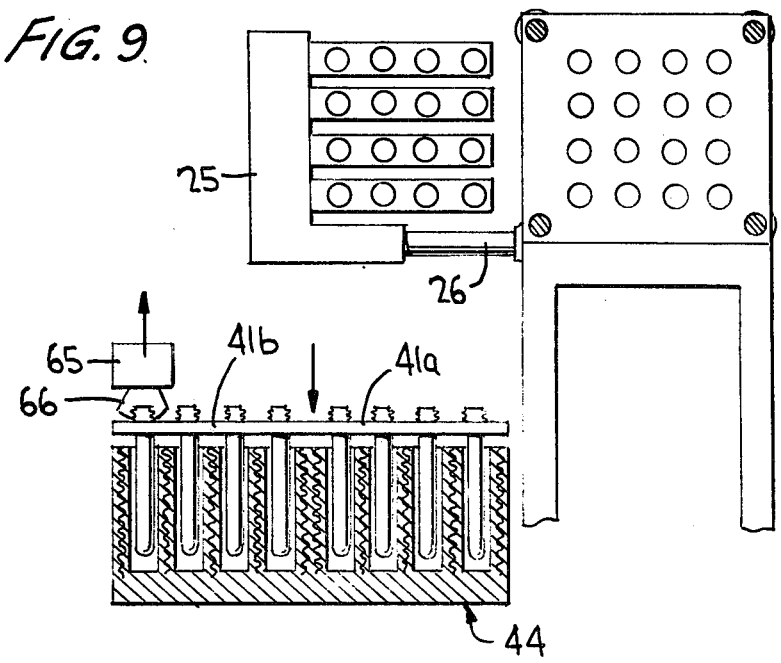

As shown in FIG. 8, the storage plate is raised vertically to receive the parisons from the neck ring carrier 25, and the heating chamber is raised vertically. The neck rings 24 open and deposit the newly formed parisons in the storage plate. Thereafter, as shown in FIG. 9, the neck ring carrier 25 rotates 90° counterclockwise, the parison storage plate lowered to the storage position, and the heating chamber raises to accept the parisons. As also shown in FIG. 9, parison picker 65 moves into position to receive the first row of parisons from the secondary storage area 41b for transfer to the blow mold section, clamping jaws 66 around the parison neck.

In FIG. 10 the neck ring carrier 25 has moved back in position to align the neck rings with the parison molds. The mold assembly closes, and another injection cycle begins as shown in FIG. 4. Parison picker 65 has been raised to clear the parisons 21 from the parison storage plate 41b.

In FIG. 11 parison picker 65, with jaws closed to grip four parisons 21, and with the parisons lifted vertically from the secondary storage plate 41b as seen in FIG. 10 commences movement to the right as shown by the arrow. Blow mold 82 has opened and shuttle bar 61 has moved right delivering the previous parisons to the blow mold. Finished bottles 81 from the blow mold are carried by the shuttle to conveyor 100.

As shown in FIG. 12, parison picker 65 has moved the parisons to the shuttle position with the picker having spread to match the center distance of shuttle 61 and blow mold 82. The blow mold is closed with the blow heads 84 down in position to blow a new set of bottles. The shuttle bar jaws are open, releasing the finished bottles 81 onto conveyor 100.

Figure 13:
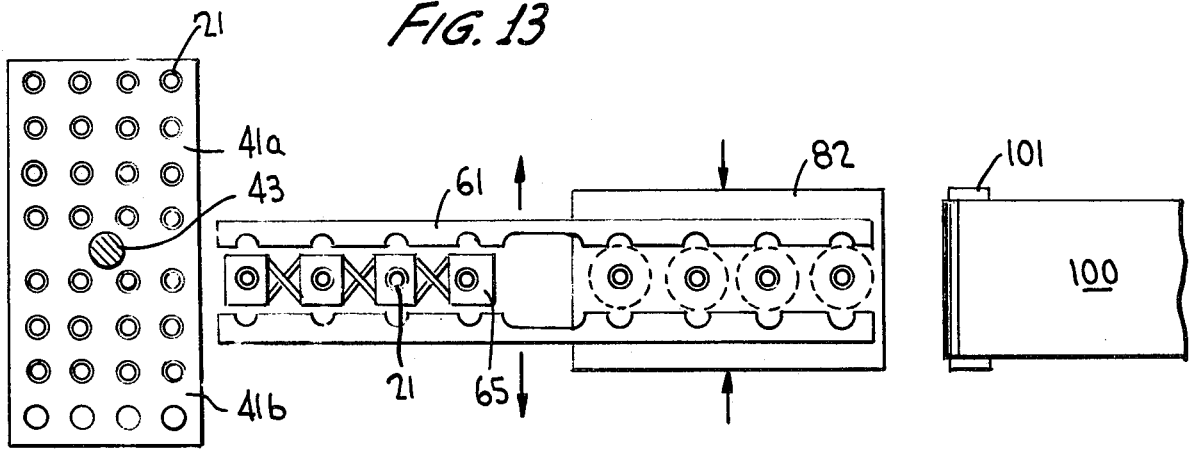

In FIG. 13 the shuttle bar 61 with jaws open has now moved to the left position in ready position to receive the parisons 21 from in picker jaws. The bottle blowing operation is continuing.

Figure 14:
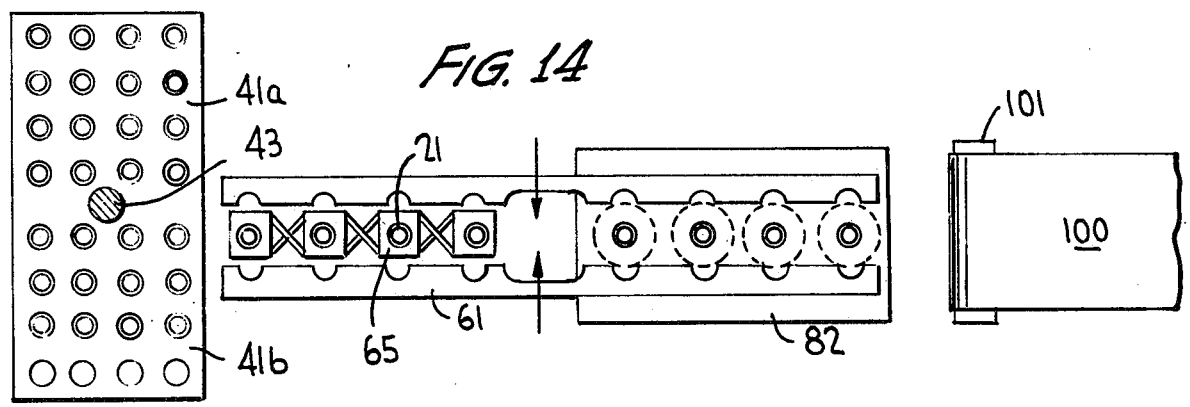
Figure 15:
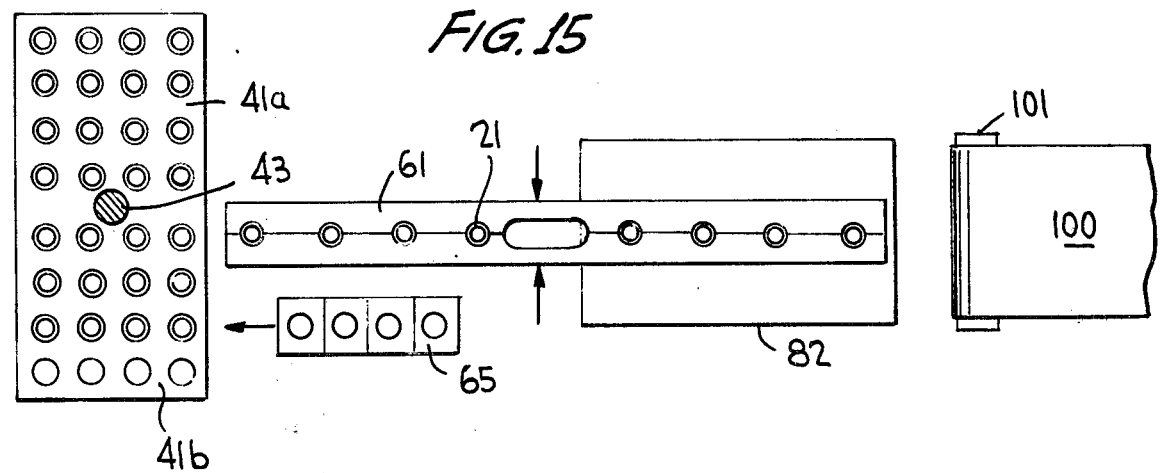

In FIG. 14 the shuttle jaws are commencing to close, as indicated by the arrows, on the parisons in picker 65. As shown in FIG. 15, the shuttle jaws are completely closed holding the parisons 21; the picker vertically lifted and moved back ready for return to storage area 41b as indicated by the arrow, commencing another transfer cycle.

The steps shown in FIGS. 10 through 15 are repeated until all of the parisons are removed from the secondary storage at which time the sequence shown in FIGS. 4 through 10 is again repeated making new parisons available.

The advantages of the presently described machine system and process include combining the injection or parison molding and blow molding operations into an integral step with optimum productivity per mold due to maximizing the efficiency of both the parison and blow mold cycles. Since the parisons are not cooled below the blowing temperature between formation and blowing, substantial thermal energy is saved and, furthermore, eliminates need for capital expenditures for complex parison reheat systems. As is apparent, duplicate handling of the parisons is eliminated.

The machine system and process of this invention provide bottles having improved uniformity in structural properties due to uniform circumferential heat distribution and heat distribution between the inside wall and outside wall of the parison. This is a result of uniform temperature conditioning of the parison during the interim storage, i.e., the hotter inner parison walls cool within the storage chamber and the temperature of the wall adjusts through the center of the wall to the outer wall to provide minimum thermal gradient within the wall. The uniform temperature distribution permits use of the thicker walled parisons since the larger temperature differentials between the inner and outer wall normally associated with thick parisons can be minimized in the storage area, permitting the blowing of not only thicker walled bottles, but larger bottles.

The machine system and process of this invention optimize the use of solid parison molds which provide improved circumferential parison cooling. Since the parison forming operation is independent of the blowing operation, the parison molds or parison forming stations can be independently spaced with respect to the blowing stations, permitting compact and close spacing of the parison forming stations, providing for shorter manifold hot runner length from the injection assembly to the parisons. The close spacing of the parison molds also minimizes die plate deflection and reduces machine bulk. Since the blow molds need not be coordinated with the parison forming operation, conventionally done in a hot-blow or one-step operation, the blow molds can be independently designed to optimize blowing conditions including more widely spaced blow molds, permitting the blowing of large diameter bottles.

Additionally, in accordance with the present machine system one core rod operates exclusively with one parison mold, thus alignment of the core rod and parison mold can be individually set. The core rod complexity is eliminated since the core rod does not need to have stretch and blow features normally associated with a hot-blow or one-step operation. The system provides for complete temperature control of parison molds, core rods, neck rings, storage chambers, and blow molds, improving process flexibility for optimizing uniformity in productivity and optimizing the structural characteristics of the blown bottles.

As will be apparent to one skilled in the art, various modifications can be made within the hereinbefore described machine system and process with respect to making improved bottles. The preferred embodiments described are not to be construed as a limitation of the invention.

It is claimed:

1. A machine system for manufacture of molecularly oriented plastic bottles comprising a plurality of parison forming stations for simultaneous formation of a plurality of parisons equal in number to the number of parison forming stations, a storage area for temporary storage of said plurality of parisons constructed and arranged to maintain said parisons in said storage area at substantially the blowing temperature of said parisons, means for simultaneously transferring said plurality of parisons from said parison forming stations to said storage area, a plurality of blowing stations for blowing parisons wherein the plurality of blowing stations is less than the plurality of parison forming stations, and means for sequentially and simultaneously transferring a plurality of parisons equal to said plurality of blowing stations from said storage area to said blowing stations.

2. The machine system of claim 1 wherein each of said parison forming stations includes a parison mold and a split neck ring assembly constructed and arranged with said mold.

3. The machine system of claim 2 wherein said parison mold is a solid mold.

4. The machine system of claim 3 wherein said parison mold and neck ring assembly are arranged in a close and compact relation.

5. The machine system of claim 4 wherein said storage area includes a storage plate having a plurality of cavities for receiving said plurality of parisons.

6. The machine system of claim 4 wherein the storage area includes storage plate comprising a primary and secondary storage area, each area having a plurality of cavities equal to said plurality of parisons, and indexing means constructed and arranged with said storage plate for movement of said storage plate whereby the primary storage area becomes the secondary storage area.

7. The machine system of claim 6 wherein each of said storage cavities is constructed and arranged with a heat chamber which will circumferentially enclose a parison of said plurality of parisons when stored in said storage area.

8. The machine system of claim 7 wherein said neck ring assembly for each parison mold is constructed and arranged on a parison carriage and includes means for moving said carriage out from operable association with said parison molds.

9. The machine system of claim 8 wherein the means for transferring said parisons to said storage area include means for positioning said storage plate in operable association with said parison carriage when said carriage is out from operable association with said parison molds and includes means for rotating said carriage.

10. The machine system of claim 1 wherein said transfer means from said storage area to said blowing stations comprises parison picker means for sequentially withdrawing a plurality of parisons from said storage area equal to said plurality of blowing stations, and shuttle means constructed and arranged therewith to receive said parisons from said parison picker, said shuttle means depositing said parisons in said plurality of blowing stations.

11. The machine system of claim 10 wherein said blowing stations each includes an integrally formed split blow mold.

12. A machine system for manufacture of molecularly oriented plastic bottles comprising an injection assembly; a parison section comprising a plurality of parison stations having a plurality of parison forming molds; said injection assembly including injection means for injecting a hot plastic into said parison forming molds and means for supplying plastic to said injection means to permit the simultaneous formation of a plurality of parisons equal in number to the number of parison forming stations; a storage area for temporarily storing said plurality of parisons constructed and arranged to maintain said parisons in said storage area at substantially the blowing temperature of said parisons; means for simultaneously transferring said parisons to said storage area from said parison stations; a blowing section comprising a plurality of blowing stations for blowing parisons wherein the plurality of blowing stations is less than the plurality of parison stations; and means for picking a plurality of parisons equal to said plurality of blowing stations from said storage area and simultaneously transferring said parisons into said blow molds.

* * * * *